US011830005B2

(12) United States Patent
Cifarelli et al.

(10) Patent No.: US 11,830,005 B2
(45) Date of Patent: Nov. 28, 2023

(54) TERMINAL OPERATOR THEFT DETECTOR AND ANALYZER

(71) Applicant: NCR Corporation, Atlanta, GA (US)

(72) Inventors: Claudio Cifarelli, Rome (IT); Diego De Cao, Ciampino (IT)

(73) Assignee: NCR Corporation, Atlanta, GA (US)

( * ) Notice: Subject to any disclaimer, the term of this patent is extended or adjusted under 35 U.S.C. 154(b) by 99 days.

(21) Appl. No.: 17/117,235

(22) Filed: Dec. 10, 2020

(65) Prior Publication Data

US 2022/0188827 A1 Jun. 16, 2022

(51) Int. Cl.
*G06Q 40/00* (2023.01)
*G06Q 20/40* (2012.01)
*G06N 20/00* (2019.01)

(52) U.S. Cl.
CPC ......... *G06Q 20/4016* (2013.01); *G06N 20/00* (2019.01)

(58) Field of Classification Search
CPC ............................ G06Q 20/4016; G06N 20/00
See application file for complete search history.

(56) References Cited

U.S. PATENT DOCUMENTS

| 10,528,950 | B2* | 1/2020 | Kar | ..................... G06F 18/2323 |
| 2009/0226099 | A1* | 9/2009 | Kundu | ............... G06Q 20/4016 |
| | | | | 382/224 |
| 2014/0279102 | A1* | 9/2014 | Hartman | .............. G06Q 20/202 |
| | | | | 705/18 |
| 2015/0206081 | A1* | 7/2015 | Lee | ......................... G06Q 10/06 |
| | | | | 705/7.13 |
| 2016/0321661 | A1* | 11/2016 | Hammond | ............. G06Q 20/20 |
| 2018/0158063 | A1* | 6/2018 | Jamtgaard | ........ G06Q 10/06398 |
| 2018/0165733 | A1* | 6/2018 | Kundu | ............... G06Q 30/0609 |
| 2019/0034931 | A1* | 1/2019 | Cash | .................... G06Q 20/389 |
| 2019/0043055 | A1* | 2/2019 | Kar | ....................... G06F 21/552 |

(Continued)

FOREIGN PATENT DOCUMENTS

WO WO-2017146694 A1 * 8/2017 ........... G06Q 20/202

OTHER PUBLICATIONS

The Wayback Machine, www.archive.org, "Aloha Restaurant Guard," Jan. 15, 2019 (Year: 2019).*

(Continued)

*Primary Examiner* — Abhishek Vyas
*Assistant Examiner* — William B. Bunker
(74) *Attorney, Agent, or Firm* — Schwegman Lundberg & Woessner, P.A.

(57) ABSTRACT

Features are extracted and tabulated for transactions on a per-operator basis. Metrics are derived from the features on a per-feature basis and on an aggregate bases for the features as a whole. Additional metrics are calculated on a per-feature basis and an aggregate bases for a group of operators. A current transaction being conducted in real time by a given operator has current features extracted and a risk score is generated. The risk score is compared against the metrics associated with the given operator and the group of operators. A determination is made as to whether the current transaction is fraud or is not fraud based on the comparison. When fraud is detected, an alert is raised, and the current transaction provided to a fraud system for further fraud evaluation.

12 Claims, 3 Drawing Sheets

(56) References Cited

U.S. PATENT DOCUMENTS

2020/0019947 A1* 1/2020 Altuev ................. G07G 1/0045
2021/0019519 A1* 1/2021 Martin ................. G06F 18/217

OTHER PUBLICATIONS

Anonymous, "Radiant's Employee Theft Deterrent Application Tracks Scams at the POS," www.hospitalitytech.com, 2010 (Year: 2010).*

Anonymous, "Method and System for Point of Sale (POS) Theft Detection," IP.com No. IPCOM000197466D, 2010 (Year: 2010.)*

Anonymous, "Machine Learning with Python—Histograms," www.tutorialspoint.com, 2019 (Year: 2019).*

* cited by examiner

TERMINAL OPERATOR THEFT DETECTOR AND ANALYZER

BACKGROUND

Many retailers, such as grocery stores, operate on small profit margins and substantially rely on volume to remain profitable. Theft and fraud are significant concerns that directly impact profitability. As a result, retailers have employed a number of security and audit measures to discover and resolve consumer and employee theft/fraud.

However, the retailers also have to ensure that transactions are being processed fast enough so as to not cause customer backups during checkouts because long customer queues and slow transaction throughput can adversely impact customer loyalty and volume. Thus, efficient and timely security technologies must be deployed. Consequently, many retailers are willing to tradeoff for lower security measures over higher security measures in order to maintain efficient transaction processing during checkouts.

A significant amount of theft/fraud occurs with employees of the retailers. This type of theft/fraud is more difficult to detect but can be more damaging to the retailer than customer theft/fraud because an employee can handle a large volume of checkouts and can work for many hours a week. A customer may only steal from a retailer once or a few times within a given period of time whereas an employee can steal many times a day and several days a week.

Additionally, employees are often acutely aware of the security measures employed by the retailer to detect theft/fraud, which makes catching the employees more difficult. For instance, an employee may only steal a small amount from each transaction throughout a given day, which evades the existing security measures for any given transaction, but at the end of the employee's shift the total amount of theft/fraud may be substantial and it's a recurring theft/fraud, since the employee remains undetected by the retailer.

Accordingly, employee theft/fraud is more of a concern for retailers than customer theft/fraud and it is often more difficult for retailers to detect.

SUMMARY

In various embodiments, methods and a system for analyzing terminal operators for theft/fraud are presented.

According to an embodiment, a method for analyzing terminal operators for theft/fraud is presented. Real-time transaction data is obtained for an operator of a transaction terminal during a transaction at the transaction terminal. Features are extracted from the real-time transaction data, metrics are derived from the features, and fraud score is calculated from the metrics. An alert is raised when the fraud score exceeds a threshold value or deviates by more than a deviation value from a range of values.

DETAILED DESCRIPTION

Figure 1:
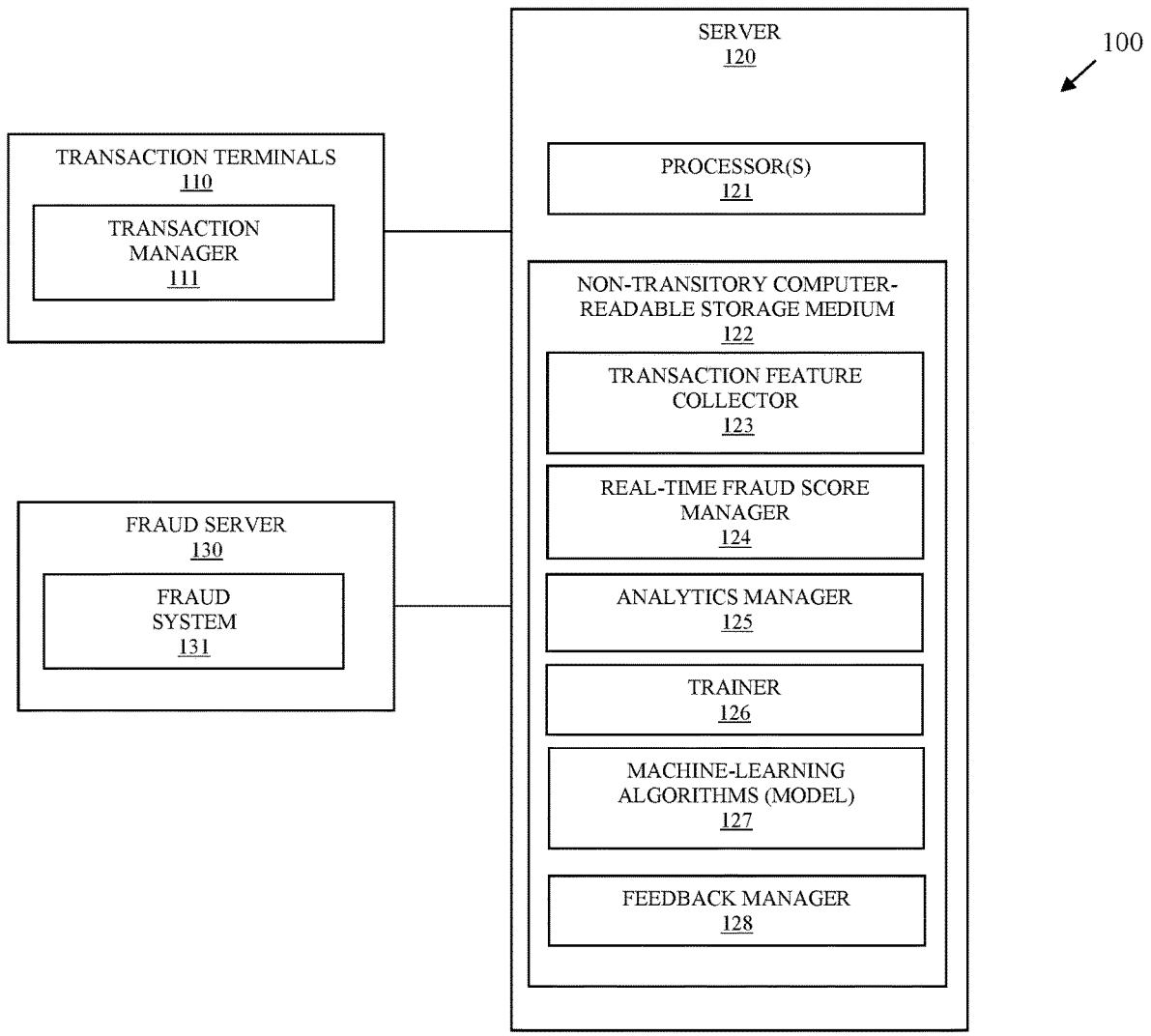
FIG. 1 is a diagram of a system for analyzing terminal operators for theft/fraud, according to an example embodiment.

FIG. 1 is a diagram of a system 100 for analyzing terminal operators for theft/fraud according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of analyzing terminal operators for theft/fraud, presented herein and below.

System 100 provides mechanism by which transaction plethora of transaction features are collected in real time for transaction terminal operators as features. The features for a given operator is compared in real time against features for a group of operators. A fraud score is calculated and based on the fraud score an alert is raised when the score exceeds a threshold or deviates from a predefined range. As fraud is detected, the features for the transaction are provided to a continuously trained machine-learning model/algorithm so that the machine-learning algorithm can learn to accurately produce fraud scores and/or identify frauds occurring in real time. Operator transaction features are also analyzed for speed and accuracy for purposes of improving overall performance, training the operators, and making performance decisions about operators.

As discussed above, operators of transaction terminals such as employees or staff of an establishment can commit a variety of theft/fraud that can go undetected. Some of these fraudulent actions by terminal operators may include, by way of example only:

1. Gift card: Gift cards are employee-created currency. A cashier overstates the currency exchange rate on international purchases, creates a refund as adjustment, and credits the refund to a gift card for themselves
2. Refunds: A cashier performs more refunds than his/her colleague; it could mean that he/she is faking refunds and keeping the cash/gift card,
3. Discounts: An item is bought with a discount and returned to another store without a receipt; so, the item is refunded to its full price.
4. Price overrides: A cashier manually overrides price for an item. If this happens a lot, an alert should be raised.
5. Coupons: When a retailer has one customer or one employee with frequent coupon transactions in which no items are sold, it means someone is doing a price adjustment, and that some kind of negative tender is occurring.
6. Line voids: when a cashier is skipping items for an acquaintance.
7. Post voids: when a transaction is deleted after completion.
8. Cancels: if a client is hurried and does not waft for the end of the transaction (does not get a receipt), the cashier can cancel the transaction and keep the cash.
9. Low-amount transactions if the cashier is performing more low-amount transaction than his/her colleague, it could mean that he/she is committing cash theft or not scanning all the items,
10. Loyalty fraud: when the cashier is using his/her (or the same) loyalty card for most of the transactions.
11. "Sweethearting": when the cashier runs through a fake bar code for a more expensive item.

Conventional security measures have been unable to effectively identify the above-noted types of operator fraud in consistent and timely manners. This is because are retailer may have many stores nationwide with millions of transaction events every day, such that the data store associated with this data is voluminous. There is also high data sparseness meaning there is a large number of transactions versus a small number of detected fraudulent events—and there are too many user behaviors to meaningful derive useful information. Additionally, there are very few logs (in some cases no logs) for fraudulent events, which makes traditional supervised machine-learning techniques challenging (an unsupervised or semi-supervised approach to anomaly detection are used herein).

As will be more completely demonstrated herein and below, system 100 provides a security-based approach to modeling transaction terminal operators for theft/fraud and performance relative to the peers. The system 100 is highly scalable, highly customized for different establishments and their needs, and processing tasks can be achieved using machine-learning methodologies.

As used herein and below, the term "cashier" refers to an employee of an establishment that is operating a Point-Of-Sale (POS) terminal, which is one type of transaction terminal. The cashier processing a cashier-assisted checkout for a customer on the POS terminal.

A "user" or a "customer" refers to an individual who is operating a Self-Service Terminal (SST) or a kiosk, which is another type of transaction terminal. The customer processing a self-service checkout on the SST or the kiosk.

An "operator" of a transaction terminal may refer to a cashier or a customer depending upon whether the transaction is a cashier-assisted checkout (operator is a cashier and the transaction terminal is an POS terminal) or whether the transaction is a self-service checkout (operator is a customer and the transaction terminal is an SST or a kiosk).

Operation of system 100 and various embodiments are now discussed with reference to FIG. 1.

System 100 includes a plurality of transaction terminals 110, a server, and a fraud server 130.

Each transaction terminal 110 comprising a processor and a non-transitory computer-readable storage medium. The medium comprising executable instructions for transaction manager 111. Executable instructions when executed by the processor from the medium cause the processor to before operations discussed herein and below with respect to transaction manager 111.

Server 120 comprises processor 121 and non-transitory computer-readable storage medium 122. Medium 122 comprises executable instructions for transaction feature collector 123, real-time fraud score manager 124, analytics manager 125, trainer 126, one or more machine-learning algorithms or model (MLAs) 127, and feedback manager 128. Executable instructions when executed by processor 121 from medium 122 cause processor 121 to perform operations with respect to 123-128.

Fraud server 130 comprises a processor and a non-transitory computer-readable storage medium. The medium comprising executable instructions for fraud system 131. Executable instructions when executed by the processor from the medium cause the processor to perform operations with respect to fraud system 131.

An establishment or retailer associated with system 100 comprises a variety of data stores, such as a transaction data store that comprises transaction data for transactions. Transaction data for any given transaction includes a variety of transaction details, such as and by way of example only, transaction terminal identifier for the transaction terminal 110 where the given transaction was processed, terminal type identifier for a type associated with the transaction terminal 110 (POS terminal, SST, or kiosk), operator identifier for an operator associated with the given transaction (a cashier identifier for a cashier, a customer identifier for a customer, or anonymous identifier when the operator is a customer whose identifier is unknown during a self-service checkout at an SST or a kiosk), a transaction identifier that uniquely identifies the transaction, a transaction type for the transaction (such as a purchase transaction, a refund transaction, a post void transaction), item identifiers for items purchased or refunded, item prices, item information, customer identifier if obtained for the customer associated with the given transaction, loyalty account for any loyalty account processed for the given transaction, discounts applied during the given transaction, any price overrides performed during the transaction, date of the given transaction, transaction start time of day for the given transaction, day of week for the given transaction, transaction end time of day for the given transaction, method of payment for the given transaction, method of credit for a given transaction associated with a refund transaction, etc.

The transaction data store may be updated in real-time as transactions are processed and/or completed by transaction manager 111. The transaction data store maintains transaction histories comprising the transaction details for the transaction of the establishment.

Transaction feature collector 123 mines the transaction data store to collected features for operators based on each operator's identifier. Collector 123 also receives real-time transaction details as transactions are processed from terminals 110; the real-time transaction details have the corresponding operator identifiers.

The features may comprise a variety of values collected or computed/tabulated by collector 123 on a per operator identifier basis and as real-time transactions are processed at terminals 110. Some example real-time features collected and computed/tabulated by collector 123 for a given operator and a given real-time transaction comprise:

1. Date—Date and time when the transaction occurred.
2. Total amount—Total amount of the transaction.
3. Number of items—Total number of items in the transaction.
4. Total amount of coupons—Sum of the amount of every coupon applied to the transaction.
5. Number of coupons—Total number of coupons applied to the transaction.
6. Total amount of discounts—Sum of all discounts applied to the transaction.
7. Number of discounts—Total number of discounts applied to the transaction (note a high ratio of number of items (3) to number of discounts (7) ((3)/(7)) is a good indication of potential fraud taking place).
8. Total amount of overridden items—Sum of the differences between the regular price of the items and the price manually entered by the operator for the transaction.
9. Number of items where the price was overridden—Number of items were the price was overridden manually by the operator, (note a high ratio of total amount of overridden items (7) to number of items (9) ((7)/(9)) is a good indication of potential fraud taking place).
10. Number of canceled items—Total number of canceled items during the transaction (note a high ratio of number of canceled items (10) to number of items (3) (((10)/(3)) is a good indication of potential fraud taking place).

11. Count of canceled transactions in a specific time period for a given operator identifier (given cashier)—An incremented counter is maintained by collector 123 on a per operator basis for each transaction canceled by the corresponding operator, when a given operator cancels too many transaction, this can be a good indicator of fraudulent behavior and the higher this value is for a given transaction of the corresponding operator the riskier that transaction is in terms of fraud.

12. Duration of the ticket—Time spent between beginning the transaction and ending the transaction (start transaction time and end transaction time—note a high ratio of duration of ticket (12) to number of items (3) ((12)/(3))) is a good indication of fraud).

13. Loyalty account—A second incremented counter is maintained by collector 123 on a per operator basis for each transaction when a single and same loyalty account is specified for a predefined period of time; the higher the second incremented counter is the riskier the transaction is.

Collector 123 maintains these features on a per operator identifier basis and updates them as necessary (for the counters) for all transactions of the corresponding operator. These features may be maintained in a separate features data store that can be linked by the transaction identifier back to specific transactions within the transaction data store. As a result, each operator is associated with a corresponding set of historically collected features for the transactions of that operator and each operator is associated with current values for the counters (features (11) and (13)).

Real-time fraud score manager 124 has access to the features data store and real time features being provided by collector 123 for a transaction currently being processed on a terminal 110 by a given operator. Fraud score manager 124 computes a fraud score for the real-time transaction and the associated operator based on the current features and historic features associated with the operator. Fraud score manager 124 derives a variety of data structures and metrics from the features. The data structures and metrics are processed to compute or calculate the fraud score. The fraud score is then compared against a threshold or against a deviation from a range and determines whether the current transaction should be inspected for fraud or not inspected for fraud. If a determination of fraud is made, the transaction details, fraud score, operator identifier, and a computed average of the operator's features are sent to fraud system 131 for inspection and an alert may also be raised by score manager 125 to a supervisory terminal or manager terminal for a supervisor or a manager to go inspect the transaction suspected of fraud. The fraud score can be computed in a number of manners.

For example, histograms (one type of metric derived) may be computed by fraud score manager 124 as a Histogram-Based Outlier Score (HBOS—another type of metric derived). A plurality of histograms are computed for each operator on a per feature basis and each feature comprising three histograms, which are 1) independent of time, 2) by hour, and 3) by day of week. Each feature's set of three histograms are then evaluated to obtain an intermediate score computed as a log of that histogram's max value ($h_{max}$) divided by that histogram's min value ($h_{min}$). The three intermediate scores for the given feature are then summed or averaged to provided a feature HBOS for the given operator ($HBOS_i$=sum or average of log ($h_{time\ indepdent\ max}/h_{time\ independent\ min}$)+log ($h_{hour\ max}/h_{hour\ min}$)+log ($h_{day\ of\ week\ max}/h_{day\ of\ week\ min}$); wherein i is a given feature for a given operator). The HBOS's for each feature are summed together and an average is obtained for the given operator (operator's averaged feature score). This same approach is used to obtain an averaged feature score for all operators (cashiers) as a group within the establishment, such that there each operator has an averaged feature score and all operators together have a group averaged feature score.

The averaged per-operator feature score (still another type of metric) and the averaged group feature score are maintained and continuously updated based on new transactions of the establishment.

When a current real-time transaction is being evaluated for a fraud score, a ratio (a type of metric) is obtained as the operator's averaged feature score to the group's averaged feature score. The real-time transaction is then evaluated to compute a sum of a log for each feature ($f_1 \ldots f_n$), e.g., log ($1/f_1 \ldots$ +log ($1/f_n$; where f is the feature values in the current transaction). This transaction fraud score is compared against the ratio and when the fraud score for the transaction exceeds the ratio by a predefined amount, an alert is raised, and the transaction details computed HBOS scores for the operator and the group and the ratio is sent to fraud system 131.

When fraud system 131 determines that a provided transaction is fraud or is not fraud, feedback is sent to feedback manager 128. Feedback manager 128 maintains a listing of transaction identifiers and the feedback (fraud or not fraud). Trainer 126 conducts training sessions with MLAs 127 providing as input, the histograms for the features, the corresponding HBOS's, the transaction fraud score, and the transaction details as input along with the feedback (was fraud or was not fraud) as the expected output. A model is derived that is continuously trained and becomes more accurate based on the training of trainer 126.

Once MLAs 127 are accurate enough for an establishment, the fraud score manager 124 can provide the histograms, transaction details, and HBOs as input to the MLAs 127 and the MLAs return as output either an indication of fraud or no fraud or a confidence value that the transaction is or is not fraud (a percentage value from 0 to 1). Fraud score manager 124 may then compare the percentage to a threshold and send the transaction to fraud system 131 and raise an alert when the confidence value is above the threshold. Again, once fraud system 131 identifies whether a believed fraud transaction was or was not fraud, the feedback is sent to feedback manager 128 for another training session by trainer with MLAs 127. In this way, the accuracy and determining fraud is continuously improving.

In an embodiment, analytics manager 125 can utilize the feature histograms and the feature data store to compile reports and derive metrics on performance of each operator relative to the other operators of the establishment. This can be done to compute feature scores for purposes of operator training, operator counseling, and operator performance reviews. The feature data store maintained by collector 123 and the histograms and HBOS's computed by fraud score manager 124 provide a wealth of operator-specific metrics and group specific metrics, that analytics manager 125 can mine for purposes of proactively and objectively managing the operators.

In an embodiment, the transactions and fraud scores are sent to fraud system 131 in real time and displayed via a dashboard for visualizing each transaction occurring in real time by an analyst or a manager. The fraud scores and transactions may be per operator and/or per a current group of operators performing the transactions with features and averages or means for each feature or the features as a whole illustrated relative to the current values. Furthermore, the visualization on the dashboard may comprise an interactive graph, which the manager can interact with to drill down into more details about a specific transaction, a specific operator, and/or a specific feature. The graph also allows interaction to drill out to view user-defined aggregations of operators, transactions, and/or features.

In an embodiment, fraud score manager 124 can perform a variety of real-time comparisons for each feature detected in a transaction against that feature's HBOS for that operator and that feature's group HBOS and when there is a deviation greater than a predefined threshold, fraud score manager 124 determines it to be fraudulent and sends it to fraud system 131 in the manners discussed above.

In an embodiment, all transactions and their corresponding features and scores are sent in real time by fraud score manager not just those transactions believed to be fraud for displaying on the dashboard.

In an embodiment, the fraud score manager 124 maintains profiles for the operator and each group of operators. The histograms generated and maintained for the operator and each group are linked to or associated with the profiles (histogram profiles or histogram-based profiles). MLAs 127 may obtain the corresponding histograms based on identifiers provided as input for a given operator or a given group of operators.

In an embodiment, the operator is a customer and the transaction terminal 110 is an SST or a kiosk. Here, a generic customer operator is maintained by collector 123 and processed by fraud score manager 124 and MLAs 127 for a fraud score. In this case, the ratio of operator's averaged feature score between the group's averaged feature score may be replaced or removed such that the fraud score determination is based on a generic single operator associated with customers as a whole. A different set of MLAs 127 or model may also be trained via flagged self-service transaction by fraud system 131 provided as feedback to feedback manager and used to train the self-service model of MLAs 127 for accurately identifying self-service fraudulent transactions. Additionally, analytics manager 125 may be used to identify areas in a workflow or interfaces that should be changed to improve customer self-service throughput and efficiencies.

In an embodiment, fraud system 131 may be subsumed into server 120, such that there is no need for a separate fraud server 130.

In an embodiment, server 120 is multiple servers 120 that logically present and cooperate as single cloud processing environment (cloud) provided as a service to a retailer (establishment).

In an embodiment, transaction terminal 110 is a POS terminal, a SST, or a kiosk.

In an embodiment, transaction terminal 110 is a mobile device operated by a cashier to perform checkouts of customers with the establishment. The mobile device is a phone, a tablet, a laptop, or a wearable processing device.

These and other embodiments are now discussed with reference to FIGS. 2-3.

Figure 2:
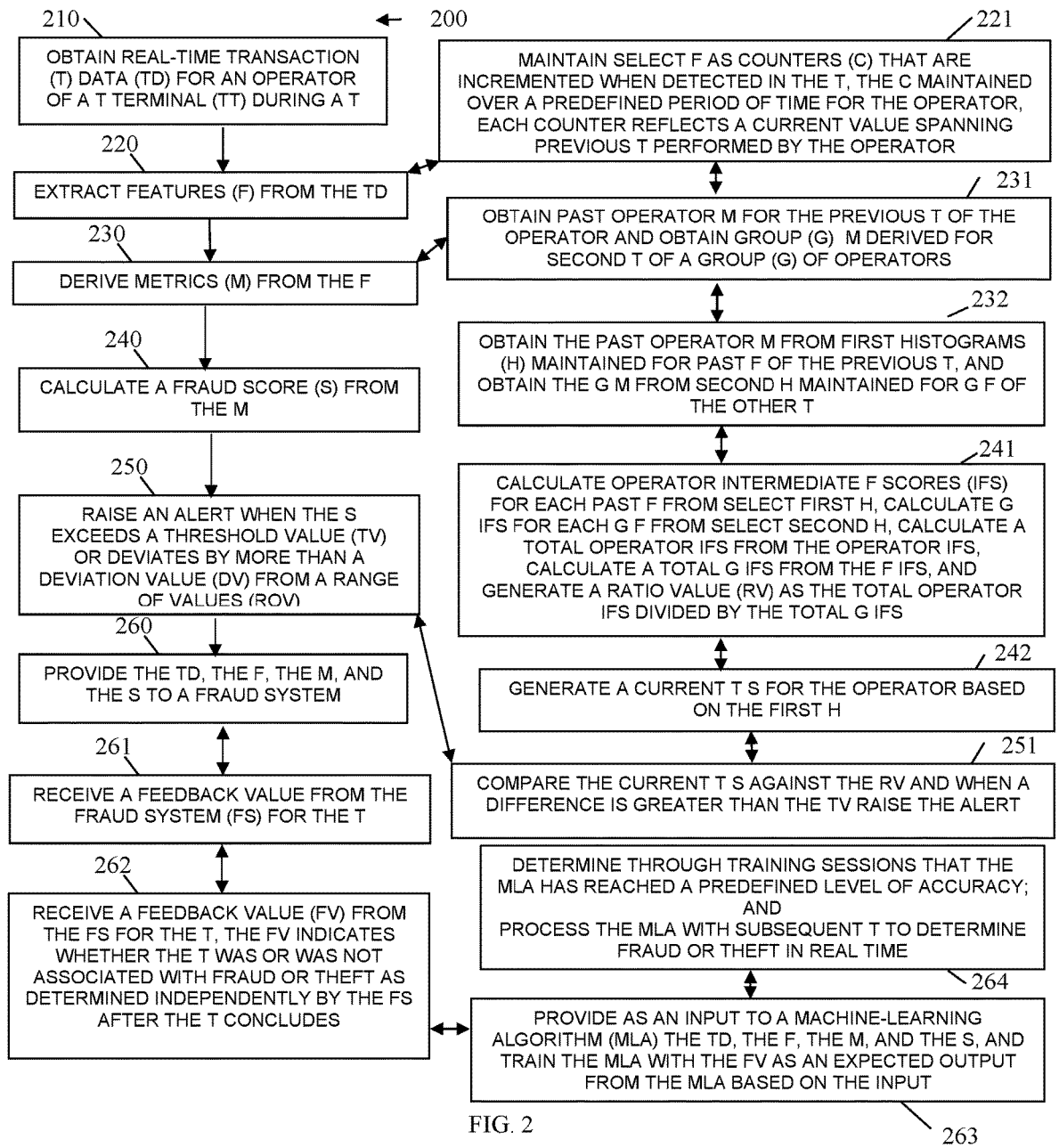
FIG. 2 is a diagram of a method for analyzing terminal operators for theft/fraud, according to an example embodiment.

FIG. 2 is a diagram of a method 200 for analyzing terminal operators for theft/fraud, according to an example embodiment. The software module(s) that implements the method 200 is referred to as a "fraud score manager." The fraud score manager is implemented as executable instructions programmed and residing within memory and/or a non-transitory computer-readable (processor-readable) storage medium and executed by one or more processors of a device. The processor(s) of the device that executes the fraud score manager are specifically configured and programmed to process the fraud score manager. The fraud score manager may have access to one or more network connections during its processing. The network connections can be wired, wireless, or a combination of wired and wireless.

In an embodiment, the device that executes the fraud score manager is server 120. In an embodiment, server 120 is a cloud-based server, a local-area network (LAN)-based server, or a wide-area network (WAN) server.

In an embodiment, the fraud score manager is all or some combination of 123-128.

At 210, the fraud score manager obtains real-time transaction data for an operator of a transaction terminal during a transaction. The transaction being performed by the operator (which may be a specific cashier of an establishment or a generic customer associated with customers performing self-service transactions at an SST of the establishment). The transaction terminal may be any of the types of transaction terminals discussed above with FIG. 1.

At 220, the fraud score manager extracts features from the transaction data. The features were listed above with FIG. 1.

In an embodiment, at 221, the fraud score manager maintains select features as counters that are incremented when detected in the transaction. The counters maintained over a predefined period of time for the operate and each counter reflects a current counter value that spans the predefined period of time during which the operator performed previous transactions.

At 230, the fraud score manager derives metrics from the features.

In an embodiment of 221 and 230, at 231, the fraud score manager obtains past operator metrics for the previous transactions of the operator and obtains group metrics derived from second transactions performed by a group of operators.

In an embodiment of 231 and at 232, the fraud score manager obtains the past operator metrics from first histograms maintained for past features of the previous transactions. The fraud score manager also obtains group metrics from the second histograms maintained for group features of the second transactions.

At 240, the fraud score manager calculates a fraud score from the metrics.

In an embodiment of 232 and 240, at 241, the fraud score manager calculates operator intermediate feature scores for each past feature from select ones of the first histograms (select first histograms), calculates group intermediate feature scores for each group feature from select ones of the second histograms (select second histograms), calculates a total operator intermediate feature score from the operator intermediate feature scores, calculates a total group intermediate score from the group intermediate features scores, and generates a ratio value as the total operator intermediate feature score divided by the total group intermediate feature score.

In an embodiment of 241 and at 242, the fraud score manager generates a current transaction fraud score for the operator and the current transaction based on the first histograms.

At 250, the fraud score manager raises an alert when the fraud score exceeds a threshold value or deviates by more than a deviation value from a range of values.

In an embodiment of 242 and 250, at 251, the fraud score manager compares the current transaction fraud score against the ratio value and when a difference is greater than the threshold value, the fraud score manager raises the alert.

In an embodiment, at 260, the fraud score manager provides the transaction data, the features, the metrics, and the fraud score to a fraud system for further evaluation.

In an embodiment of 260 and at 261, the fraud score manager receives a feedback value from the fraud system.

In an embodiment of 261 and at 262, the fraud score manager receives the feedback value for the transaction. The feedback value indicates whether the transaction actually had fraud or theft or actually did not have fraud or theft as independently determined by the fraud system after the transaction concluded.

In an embodiment of 262 and at 263, the fraud score manager provides as input to an MLA the transaction data, the features, the metrics, and the fraud score and trains the MLA with the feedback value as an expected output from the MLA based on the provided input.

In an embodiment of 262 and at 264, the fraud score manager determines through the training session that the MLA has reached a predefined level of accuracy in predicting fraud or theft for transactions. The fraud score manager processes the MLA with subsequent transactions to determined fraud or theft in real time.

Figure 3:
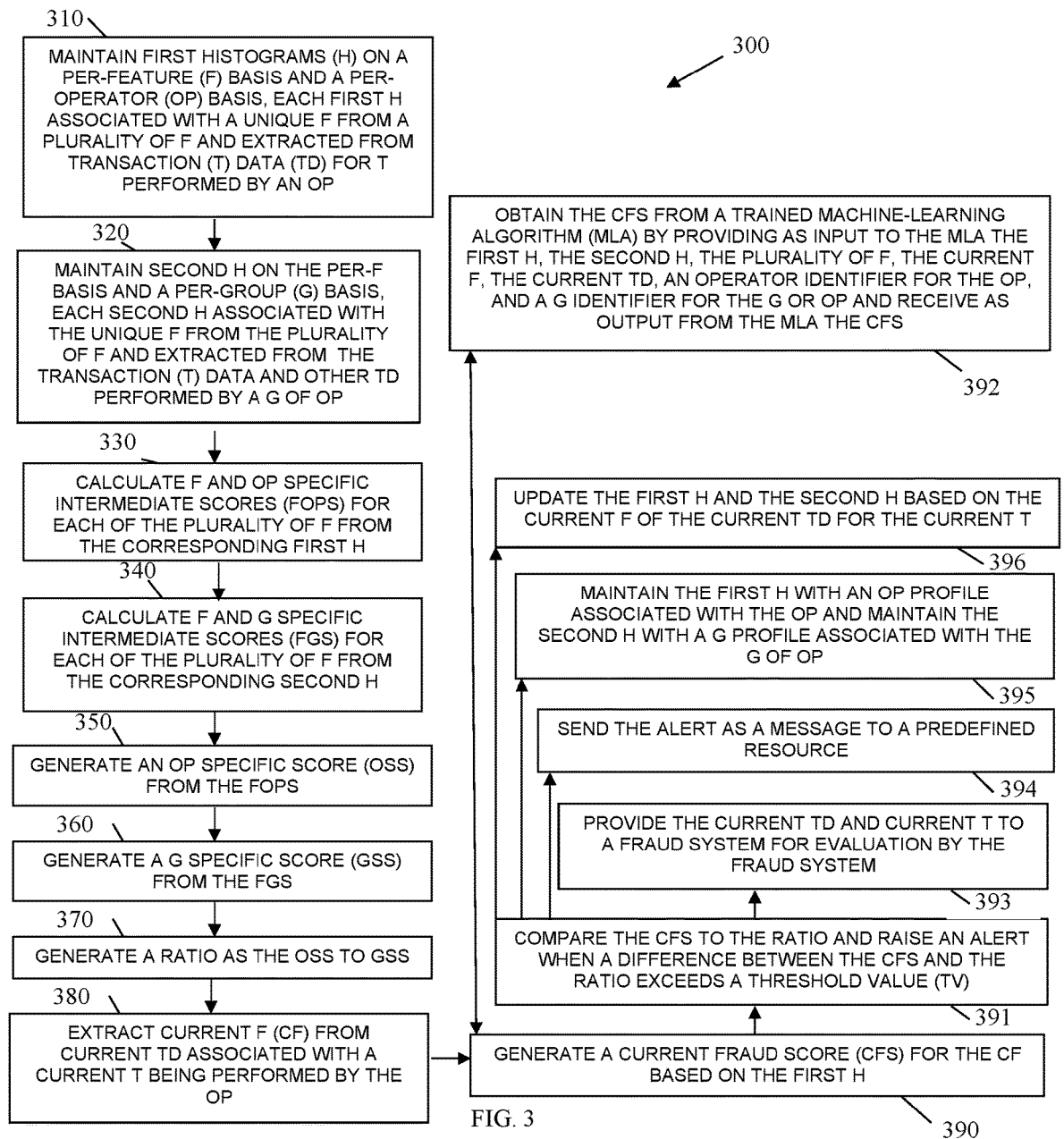
FIG. 3 is a diagram of another method for analyzing terminal operators for theft/fraud, according to an example embodiment.

FIG. 3 is a diagram of another method 300 for analyzing terminal operators for theft/fraud, according to an example embodiment. The software module(s) that implements the method 300 is referred to as an "terminal operator security monitor." The terminal operator security monitor is implemented as executable instructions programmed and residing within memory and/or a non-transitory computer-readable (processor-readable) storage medium and executed by one or more processors of a device. The processors that execute the terminal operator security monitor are specifically configured and programmed to process terminal operator security monitor. The terminal operator security monitor may have access to one or more network connections during its processing. The network connections can be wired, wireless, or a combination of wired and wireless.

In an embodiment, the device that executes the terminal operator security monitor is the server 120. In an embodiment, the server 120 is a cloud processing environment, a LAN server, or a WAN server.

In an embodiment, the terminal operator security monitor is all of or some combination of 123-128 and/or the method 300.

The terminal operator security monitor presents another and, in some ways, enhanced processing perspective of the method 200 discussed above.

At 310, the terminal operator security monitor maintains first histograms on a per-feature basis and a per-operator basis. Each first histogram associated with a unique feature from a plurality of features and extracted from transaction data for transactions performed by an operator.

At 320, the terminal operator security monitor maintains second histograms on the per-feature basis and a per-group basis. Each second histogram associated with the unique feature from the plurality of features and extracted from the transaction data and other transaction data performed by a group of operators.

At 330, the terminal operator security monitor calculates feature and operator specific intermediate scores for each of the plurality of features from the corresponding first histograms.

At 340, the terminal operator security monitor calculates feature and group specific intermediate scores for each of the plurality of features from the corresponding second histograms.

At 350, the terminal operator security monitor generates an operator-specific score from the feature and operator specific scores.

At 360, the terminal operator security monitor generates a group-specific score from the feature and group specific intermediate scores.

At 370, the terminal operator security monitor generates a ratio as the operator-specific score to the group-specific score.

At 380, the terminal operator security monitor extracts current features from current transaction data associated with a current transaction being performed by the operator.

At 390, the terminal operator security monitor generates a current fraud score for the current features based on the first histograms.

At 391, the terminal operator security monitor compares the current fraud score to the ratio and raises an alert when a difference between the current fraud score and the ratio exceeds a threshold value.

In an embodiment, at 392, the terminal operator security monitor obtains the current fraud score from a trained MLA by providing as input to the trained MLA, the first histograms, the second histograms, the plurality of features, the current features, the current transaction data, and operator identifier for the operator, and a group identifier for the group of operators. The terminal operator security monitor receives as output from the trained MLA the current fraud score.

In an embodiment, at 393, the terminal operator security monitor provides the current transaction data and the current transaction to a fraud system for evaluation by the fraud system.

In an embodiment, at 394, the terminal operator security monitor sends the alert as a message to a predefined resource.

In an embodiment, at 395, the terminal operator security monitor maintains the first histograms within an operator profile associated with the operator and maintains the second histograms with a group file associated with the group of operators.

In an embodiment, at 396, the terminal operator security monitor updates the first histograms and the second histograms based on the current features of the current transaction data for the current transaction.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method for detecting operator fraud at a computerized point of sale (POS) transaction terminal of a retailer, comprising:

obtaining, by a processor of a computer server, real-time transaction data for a current transaction for an operator of the transaction terminal handling the transaction during the current transaction at the transaction terminal, the server being in electronic communication with the transaction terminal and providing fraud detection services to the retailer;

extracting, by the processor, features from the real-time transaction data, wherein the features comprise current date of the transaction, terminal identifier for the transaction terminal, and operator identifier for the operator, a transaction type for the transaction, total amount of the transaction, total number of coupons applied during the transaction, a summed amount of discounts applied during the transaction, total number of discounts applied during the transaction, total amount of overridden items during the transaction, a number of items where price was overridden during the transaction, a count of canceled transactions during a specific time period for the operator, duration of the transaction from start to end, and a loyalty account associated with the transaction;

obtaining histograms maintained for past transactions associated with the operator, the terminal, other terminals, and other operators of the retailer, wherein the other operators comprise an operator group of which the operator is a member, wherein the histograms are generated on a per feature basis, a per operator basis, and a per group basis;

updating the histograms based on the features;

deriving, by the processor, metrics from the updated histograms;

calculating, by the processor, an intermediate fraud score from the metrics, wherein the intermediate fraud score identifies whether the operator is likely currently engaged in fraud during the transaction with respect to one or more of gift cards, refunds, discounts, price overrides, coupons, voids, cancels, low-amount transaction, loyalty fraud, and sweethearting, providing as input to a trained machine-learning algorithm the features, the histograms, the metrics, the intermediate fraud score, and the real-time transaction data, and receiving as output from the trained machine-learning algorithm a current fraud score for the current transaction, wherein the fraud score is based at least in part on a ratio of an operator specific score and a group specific score;

raising, by the processor, an alert when the fraud score exceeds a threshold value or deviates by more than a deviation value from a range of values; and subsequently receiving an indication from a fraud system as to whether the transaction was actual fraud or was not fraud; and creating a feedback training loop with the trained machine-learning algorithm and providing the indication to the machine-learning algorithm via the feedback training loop to improve the accuracy of the machine-learning algorithm.

2. The method of claim 1 further comprising, providing, by the processor, the transaction data, the features, the updated histograms, the metrics, and the fraud score to the fraud system.

3. The method of claim 1 further comprising, sending, by the processor, a message to a predefined resource to audit the transaction of the operator when the fraud score exceeds the threshold value or deviates from the range of values by more than the deviation value.

4. The method of claim 1, wherein extracting further includes maintaining select features as counters that are incremented when detected in the transaction, the counters maintained over a predefined period of time for the operator and each counter reflecting a current counter value that spans the predefined period of time during which the operator performed previous transactions.

5. The method of claim 4, wherein deriving further includes obtaining past operator metrics derived for the previous transactions of the operator and obtaining group metrics derived for second transactions performed by a group of operators.

6. The method of claim 5, wherein deriving further includes obtaining the past operator metrics from first histograms maintained for past features of the previous transactions and obtaining the group metrics from second histograms maintained for group features of the second transactions.

7. A method for detecting operator fraud at a computerized point-of-sale (POS) transaction terminal of a retailer, comprising:

maintaining, by a processor of a computer server, first histograms on a per-feature basis and a per-operator basis, each first histogram associated with a unique feature of a plurality of features extracted from transaction data for transactions performed by an operator, wherein the server being in electronic communication with the transaction terminal and providing fraud detection services to the retailer;

maintaining, by the processor, second histograms on the per-feature basis and per-group basis, each second histogram associated with the unique feature of the plurality of features and extracted from the transaction data and other transaction data performed by a group of operators of the retailer of which the operator is a member;

calculating, by the processor, feature and operator specific intermediate scores for each of the plurality of features from the corresponding first histograms;

calculating, by the processor, feature and group specific intermediate scores for each of the plurality of features from the corresponding second histograms, wherein the features comprise current date of each transaction, total amount of each transaction, total number of coupons applied during each transaction, a summed amount of discounts applied during each transaction, total number of discounts applied during each transaction, total amount of overridden items during each transaction, a number of items where price was overridden during each transaction, a count of canceled transactions during a specific time period for each operator, duration of each transaction from start to end, and a loyalty account associated with each transaction;

generating, by the processor, an operator-specific feature score from the feature and operator specific intermediate scores;

generating, by the processor, a group-specific feature score from the feature and group-specific intermediate scores;

generating, by the processor, a ratio as the operator-specific feature score to the group-specific score;

extracting, by the processor, current features from current transaction data associated with a current transaction being performed by the operator who is handling the current transaction;

generating, by the processor, a current fraud score for the current features for the current transaction based on the first histograms, wherein generating further includes obtaining the current fraud score from a trained machine-learning algorithm by providing as input to the trained machine-learning algorithm the first histograms, the second histograms, the plurality of features, the current features, the current transaction data, an operator identifier for the operator, and a group identifier for the group of operators and receiving as output from the trained machine-learning algorithm the current fraud score, wherein the current fraud score is based at least in part on a ration of the operator-specific feature score and the group specific score;

comparing, by the processor, the current fraud score to the ratio and raising an alert when a difference between the current fraud score and the ratio exceeds a threshold value indicating the operator was likely engaged in fraud during the current transaction associated with one or more of gift cards, refunds, discounts, price overrides, coupons, voids, cancels, low-amount transaction, loyalty fraud, and sweethearting;

subsequently receiving an indication from a fraud system as to whether the current transaction was actual fraud or was not fraud;

creating a feedback training loop with the trained machine-learning algorithm; and providing the indication to the machine-learning algorithm via the feedback training loop to improve the accuracy of the trained machine-learning algorithm.

8. The method of claim 7 further comprising, providing, by the processor, the current transaction data to the fraud system for evaluation by the fraud system.

9. The method of claim 7 further comprising, sending, by the processor, the alert as a message to a predefined resource.

10. The method of claim 7 further comprising maintaining, by the processor, the first histograms with an operator profile associated with the operator and maintaining the second histograms with a group profile associated with the group of operators.

11. The method of claim 7 further comprising, updating, by the processor, the first histograms and the second histograms based on the current features of the current transaction data for the current transaction.

12. A system for detecting operator fraud at a computerized point-of-sale (POS) transaction terminal of a retailer, comprising:

a computer server comprising a processor and a non-transitory computer-readable storage medium, the server being in electronic communication with the transaction terminal and providing fraud detection services to the retailer;

the non-transitory computer-readable storage medium comprising executable instructions;

the executable instructions when executed on the processor from the non-transitory computer-readable storage medium cause the processor to perform operations comprising:

maintaining a first histogram profile for transaction features of transactions performed by an operator who is handling a current transaction at the transaction terminal;

maintaining a second histogram profile for the transaction features of other transactions performed by a group of operators of the retailer of which the operator is a member, wherein the features comprise current date of each transaction, total amount of each transaction, total number of coupons applied during each transaction, a summed amount of discounts applied during each transaction, total number of discounts applied during each transaction, total amount of overridden items during each transaction, a number of items where price was overridden during each transaction, a count of canceled transactions during a specific time period for each operator, duration of each transaction from start to end, and a loyalty account associated with each transaction;

calculating a current fraud score for current features of the current transaction performed by the operator based on the first histogram profile, wherein calculating further includes providing as input to a trained machine-learning algorithm the first histogram profile, the second histogram profile, an operator identifier for the operator, a group identifier for the group of operators, the current features, and the current transaction data and receiving the current fraud score as output from the trained machine-learning algorithm, wherein the current fraud score is based at least in part on a ratio of an operator specific score and a group specific score;

determining whether a transaction fraud is present for the current transaction based on comparing the current fraud score against a ratio derived from the first histogram profile to the second histogram profile;

sending a real-time alert to evaluate the current transaction data and the current transaction when the transaction fraud is present for the current transaction based on the determining and indicating the operator was likely engaged in frauds during the current transaction that are associated with one or more of gift cards, refunds, discounts, price overrides, coupons, voids, cancels, low-amount transaction, loyalty fraud, and sweethearting;

subsequently receiving an indication from a fraud system as to whether the current transaction was actual fraud or was not fraud;

creating a feedback training loop with the trained machine-learning algorithm; and providing the indication to the machine-learning algorithm via the feedback training loop to improve the accuracy of the trained machine-learning algorithm.

\* \* \* \* \*